United States Patent [19]
Harrison

[11] Patent Number: 5,562,023
[45] Date of Patent: Oct. 8, 1996

[54] RIB RACK WITH SAUCE PAN

[76] Inventor: Calvin L. Harrison, 2880 Palm St., Memphis, Tenn. 38127

[21] Appl. No.: 618,356

[22] Filed: Mar. 19, 1996

[51] Int. Cl.⁶ ............................ A47J 37/07; A47J 43/18; F24C 15/00
[52] U.S. Cl. .................. 99/426; 99/446; 99/448; 99/450; 126/337 R; 126/41 R
[58] Field of Search ............... 99/331, 426, 444–450, 99/400, 401; 126/41 R, 337 R; 211/126, 133, 181; 220/23.2, 23.8, 639, 912; D6/553, 572; D7/334, 357, 359, 402

[56] References Cited

U.S. PATENT DOCUMENTS

| D. 246,627 | 12/1977 | Sugiyama | D7/359 |
|---|---|---|---|
| D. 278,500 | 4/1985 | Rafferty, Sr. | D6/572 |
| 446,855 | 2/1891 | Earle | 99/426 |
| 2,212,207 | 8/1940 | Irwin et al. | 99/426 |
| 3,364,844 | 1/1968 | Felske | 99/448 |
| 4,195,747 | 4/1980 | Hare | 220/3.2 |
| 4,633,773 | 1/1987 | Jay | 99/446 X |
| 4,942,862 | 7/1990 | Alden et al. | 126/337 R |
| 5,158,009 | 10/1992 | Stewart | 99/394 X |
| 5,203,254 | 4/1993 | Fletcher | 99/449 X |
| 5,211,105 | 5/1993 | Liu | 99/400 X |
| 5,363,750 | 11/1994 | Miller et al. | 99/448 X |
| 5,467,691 | 11/1995 | Koziol | 99/450 X |

*Primary Examiner*—Timothy F. Simone

[57] ABSTRACT

A rib rack with sauce pan comprised of a rack system comprised of elongated rods. The rack system is arranged to hold a plurality of racks of ribs therein. The device includes a sauce pan having an open top, a closed bottom, and upwardly extending peripheral edge. The upwardly extending peripheral edge has a plurality of apertures formed therethrough. The sauce pan is positionable beneath the rack system within a grill or other cooking medium.

5 Claims, 4 Drawing Sheets

RIB RACK WITH SAUCE PAN

BACKGROUND OF THE INVENTION

1. Field of the Invention

The present invention relates to a rib rack with sauce pan and more particularly pertains to increasing the volume of ribs to be cooked at one time on a grill with a rib rack with sauce pan.

2. Description of the Prior Art

The use of barbecue cooking systems is known in the prior art. More specifically, barbecue cooking systems heretofore devised and utilized for the purpose of cooking meats and the like are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,263,595 to Hilstolsky discloses a rack system including a horizontal polygonal base frame assembly and identical top frame for use with pans and is provided for teaching of interlocking wire frame work used to form a rack.

U.S. Pat. No. 3,721,177 to Booker discloses a commercial barbecue cooker and is provided for illustrating the use of a plurality of stacked racks for supporting ribs during the cooking procedure.

U.S. Pat. No. Des. 278,500 to Rafferty, Sr. discloses the ornamental design for a barbecue skewer rack.

U.S. Pat. No. Des. 296,861 to Fielding et al. discloses the ornamental design for a combination support rack and bowl for barbecue accessories.

U.S. Pat. No. Des. 351,307 to Birmingham discloses the ornamental design for a combined barbecue smoker and cooker.

While these devices fulfill their respective, particular objective and requirements, the aforementioned patents do not describe a rib rack with sauce pan for increasing the volume of ribs to be cooked at one time on a grill.

In this respect, the rib rack with sauce pan according to the present invention substantially departs from the conventional concepts and designs of the prior art, and in doing so provides an apparatus primarily developed for the purpose of increasing the volume of ribs to be cooked at one time on a grill.

Therefore, it can be appreciated that there exists a continuing need for new and improved rib rack with sauce pan which can be used for increasing the volume of ribs to be cooked at one time on a grill. In this regard, the present invention substantially fulfills this need.

SUMMARY OF THE INVENTION

In the view of the foregoing disadvantages inherent in the known types of barbecue cooking systems now present in the prior art, the present invention provides an improved rib rack with sauce pan. As such, the general purpose of the present invention, which will be described subsequently in greater detail, is to provide a new and improved rib rack with sauce pan and method which has all the advantages of the prior art and none of the disadvantages.

To attain this, the present invention essentially comprises a rack system comprised of elongated rods. The rack system has an elongated circular base portion. The base portion has a pair of long intermediate rods extending between arcuate end rods. The pair of long intermediate rods have cross bars extending therebetween inwardly of end portions thereof. The rack system has a plurality of racks. Each of the racks has end portions and an intermediate portion therebetween. The end portions are secured to the cross bars in a spaced and angular relationship whereby the intermediate portion is disposed over a central open portion of the base portion. The device includes a sauce pan having an open top, a closed bottom, and upwardly extending peripheral edge. The upwardly extending peripheral edge has a rim extending outwardly from an upper portion thereof. The upwardly extending peripheral edge has a plurality of apertures therethrough. The plurality of apertures have a mesh screen disposed therein. The device includes a support rack dimensioned for receipt of the sauce pan therein. The support rack has hooked end portions for coupling to a grill.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved rib rack with sauce pan which has all the advantages of the prior art barbecue cooking systems and none of the disadvantages.

It is another object of the present invention to provide a new and improved rib rack with sauce pan which may be easily and efficiently manufactured and marketed.

It is a further object of the present invention to provide a new and improved rib rack with sauce pan which is of durable and reliable construction.

An even further object of the present invention is to provide a new and improved rib rack with sauce pan which is susceptible of a low cost of manufacture with regard to both materials and labor, and which accordingly is then susceptible of low prices of sale to the consuming public, thereby making such a rib rack with sauce pan economically available to the buying public.

Still yet another object of the present invention is to provide a new and improved rib rack with sauce pan which provides in the apparatuses and methods of the prior art some of the advantages thereof, while simultaneously overcoming some of the disadvantages normally associated therewith.

Even still another object of the present invention is to provide a new and improved rib rack with sauce pan for increasing the volume of ribs to be cooked at one time on a grill.

Lastly, it is an object of the present invention to provide a new and improved rib rack with sauce pan comprised of a rack system comprised of elongated rods. The rack system is arranged to hold a plurality of racks of ribs therein. The device includes a sauce pan having an open top, a closed bottom, and upwardly extending peripheral edge. The upwardly extending peripheral edge has a plurality of apertures formed therethrough. The sauce Dan is positionable beneath the rack system within a grill or other cooking medium.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
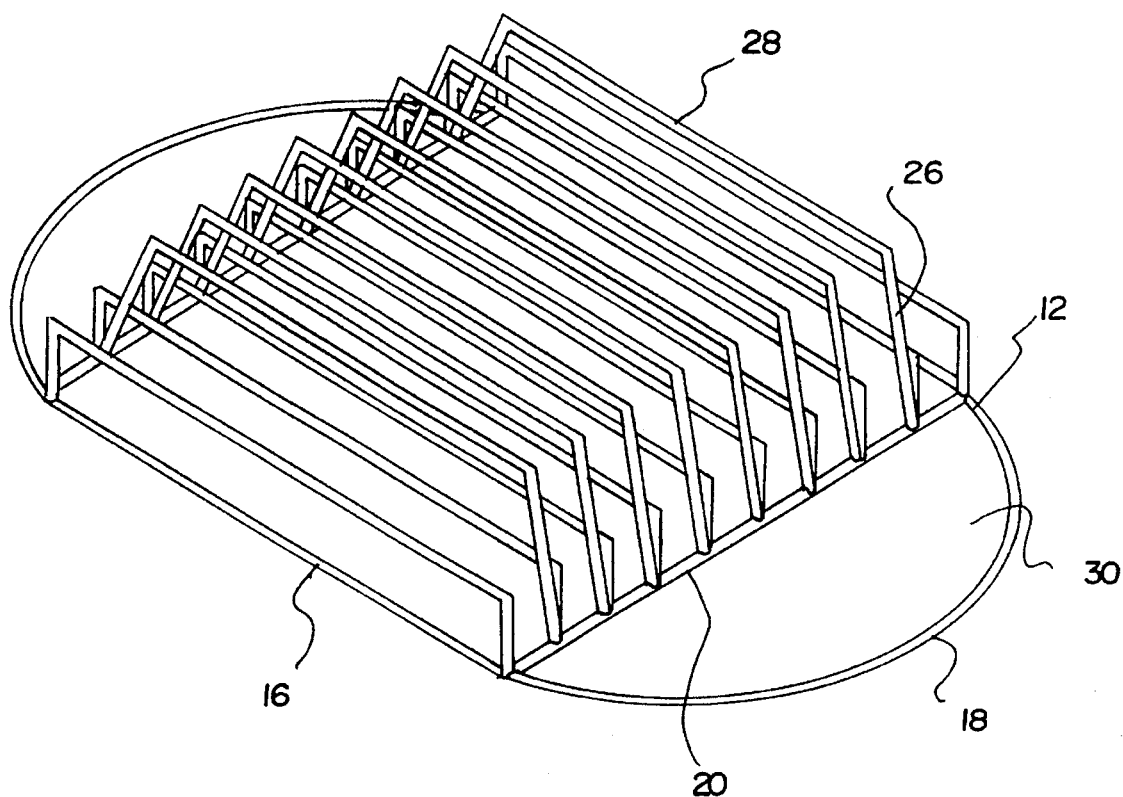
FIG. 1 is a perspective view of the rack system of the present invention.
Figure 2:
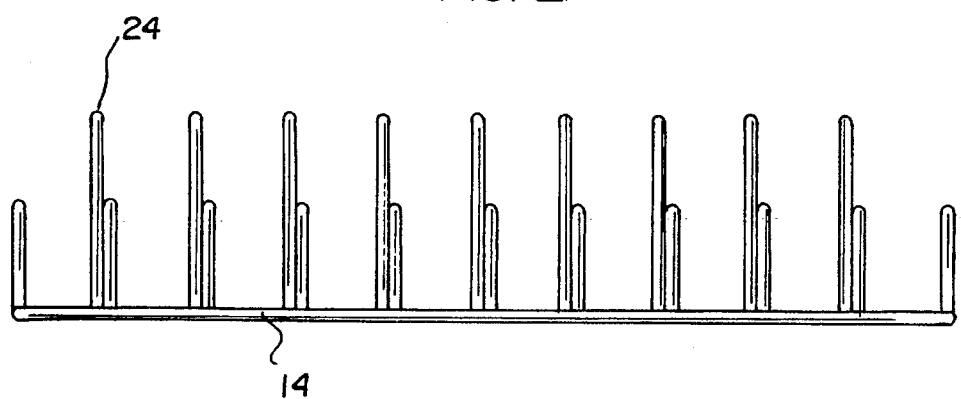
FIG. 2 is a side elevation view of the rack system of the present invention.
Figure 3:
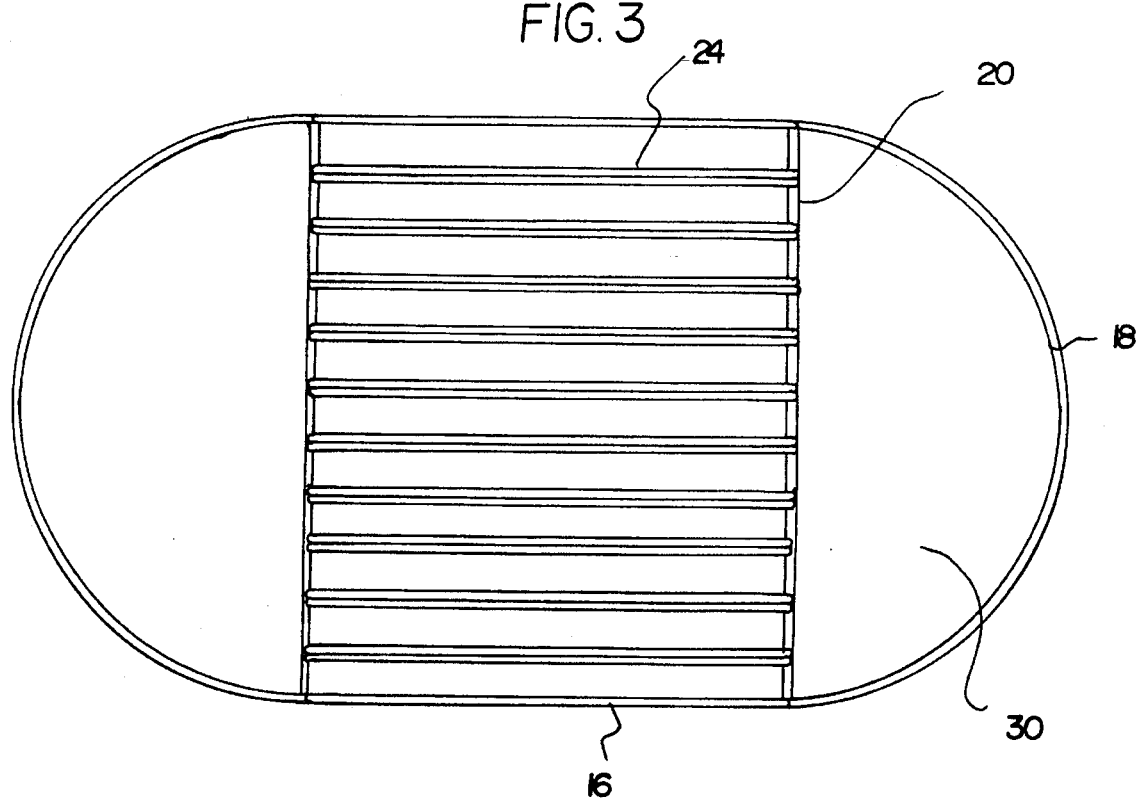
FIG. 3 is a plan view of the rack system of the present invention.
Figure 4:
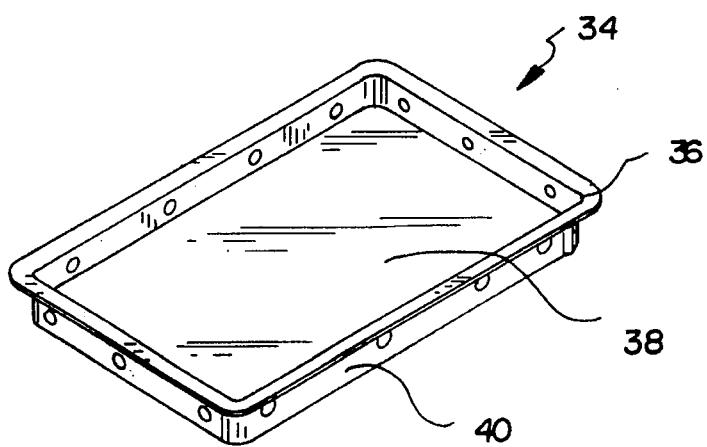
FIG. 4 is a perspective view of the sauce pan of the present invention.
Figure 5:
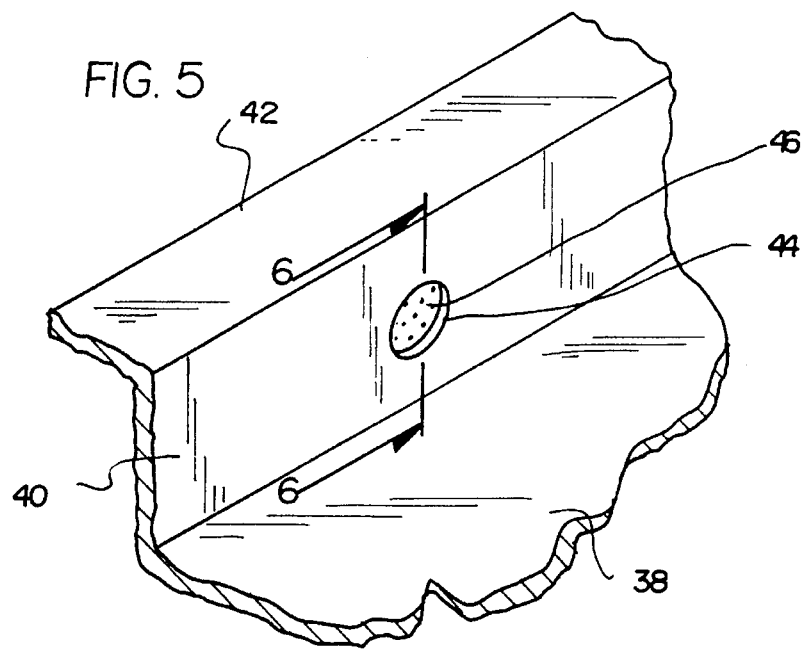
FIG. 5 is a fragmentary perspective view of the sauce pan of the present invention illustrating the air vents.
Figure 6:
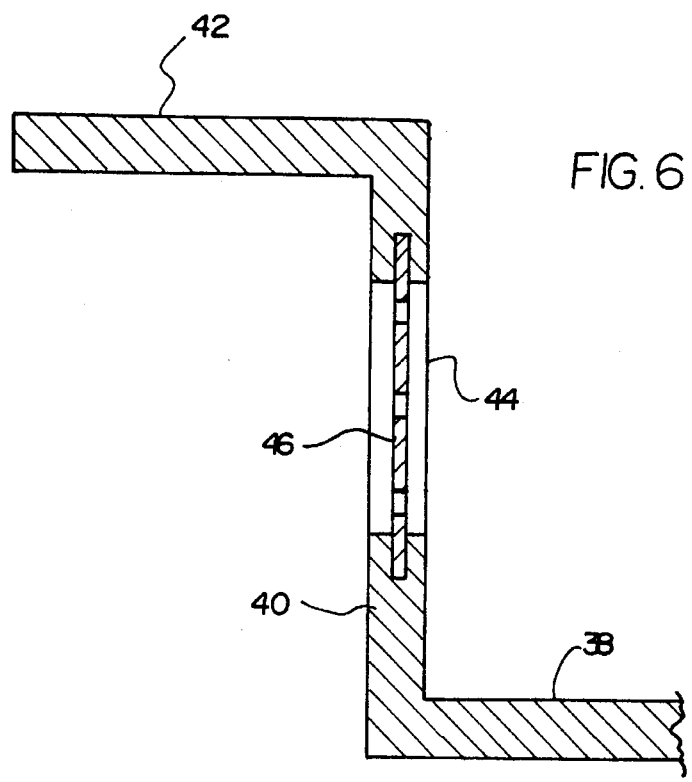
FIG. 6 is a cross-sectional view of the air vents of the sauce pan of the present invention as taken along line 6—6 of FIG. 5.
Figure 7:
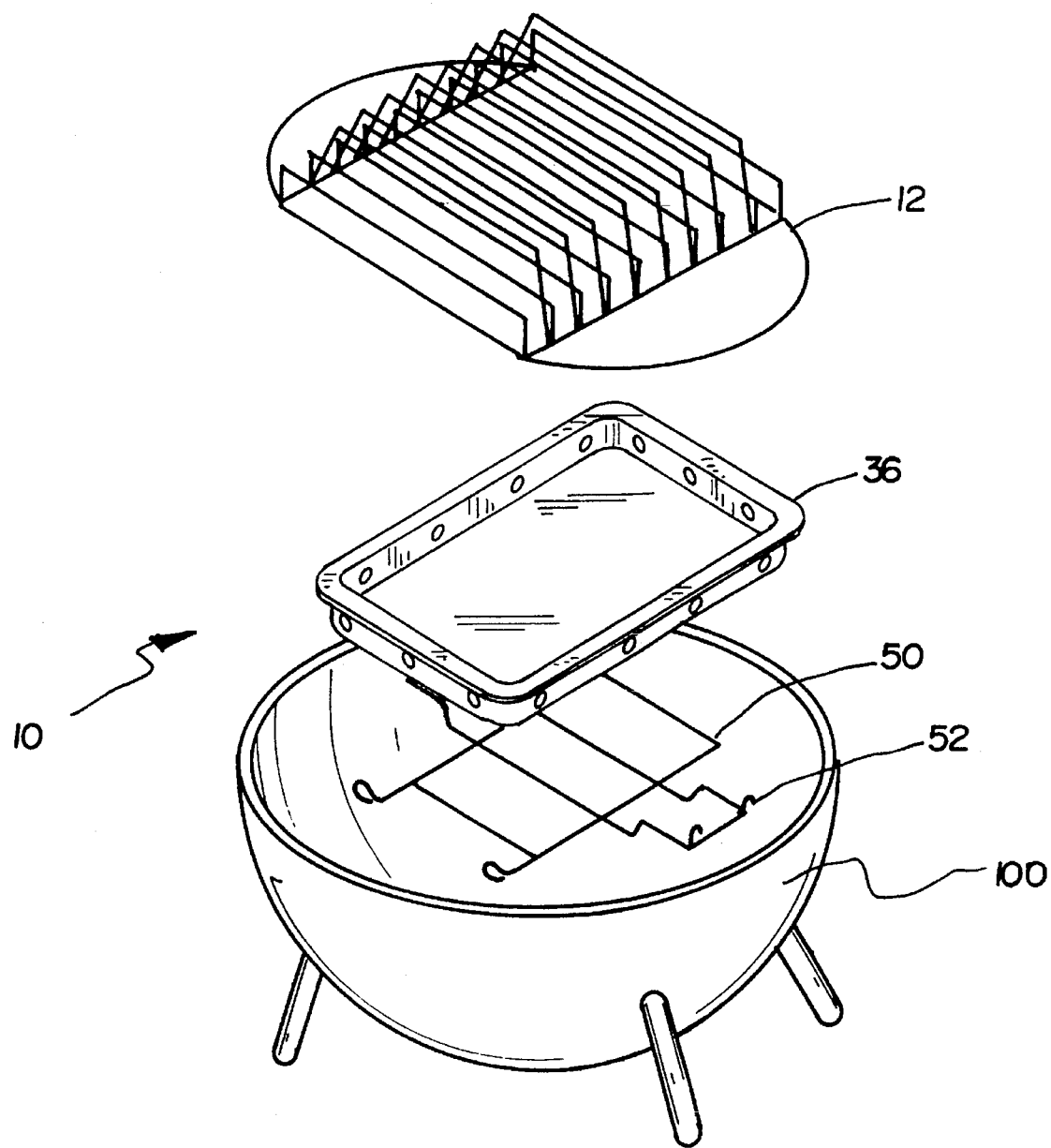
FIG. 7 is a perspective view of the preferred embodiment of the rib rack with sauce pan constructed in accordance with the principles of the present invention.

With reference now to the drawings, and in particular, to FIGS. 1–6 thereof, the preferred embodiment of the new and improved rib rack with sauce pan embodying the principles and concepts of the present invention and generally designated by the reference number 10 will be described.

Specifically, it will be noted in the various Figures that the device relates to a new and improved rib rack with sauce pan for increasing the volume of ribs to be cooked at one time on a grill. In its broadest context, the device consists of a rack system, a sauce pan, and a support rack. Such components are individually configured and correlated with respect to each other so as to attain the desired objective.

The device 10 includes a rack system 12 comprised of elongated rods. The rack system 12 has an elongated circular base portion 14. The base portion 14 has a pair of long intermediate rods 16 extending between arcuate end rods 18. The pair of long intermediate rods 18 have cross bars 20 extending therebetween inwardly of end portions thereof. The rack system 12 has a plurality of racks 24. Each of the racks 24 has end portions 26 and an intermediate portion 28 therebetween. The end portions 26 are secured to the cross bars 20 in a spaced and angular relationship whereby the intermediate portion 28 is disposed over a central open portion 30 of the base portion 14. The base portion 14 can be secured around a peripheral edge of a grill in the same normal manner as would a standard grill rack. The plurality of racks 24 allow for ribs to be positioned between each of the racks 24 to increase to amount of ribs to be cooked at one time. The plurality of racks 24 should extend upwardly to a position sufficient enough to support food, such as ribs, therein. Once ribs are placed within the plurality of racks 24, space will exist to allow for more ribs to be placed upon the intermediate portions 28. The plurality of racks 24 will allow for at least two to three times the amount of ribs to be cooked at one time.

The device 10 includes a sauce pan 34 having an open top 36, a closed bottom 38, and upwardly extending peripheral edge 40. The upwardly extending peripheral edge 40 has a rim 42 extending outwardly from an upper portion thereof. The upwardly extending peripheral edge 40 has a plurality of apertures 44 therethrough. The plurality of apertures 44 have a mesh screen 46 disposed therein. The sauce pan 34 would be positioned beneath the rack system 12 within a grill 100 on a support rack. The plurality of apertures 44 would allow for heat generated by the grill 100 to pass therethrough to aid in the cooking process of the ribs. The sauce pan 34 would also catch drippings from the ribs while being cooked. The plurality of apertures 44 would allow heat, charcoal, and barbecue flavor to escape onto the ribs or other food being cooked, thereby creating a mushroom effect of heat through the plurality of apertures 44 to help distribute the heat from the top of the grill 100 downward to enable a more precise method of cooking.

Lastly, the device 10 includes a support rack 50 dimensioned for receipt of the sauce pan 34 therein. The support rack 50 has hooked end portions 52 for coupling to the grill 100.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by LETTERS PATENT of the United States is as follows:

1. A rib rack with sauce pan for increasing the volume of ribs to be cooked at one time on a grill comprising, in combination:

a rack system comprised of elongated rods, the rack system having an elongated circular base portion, the base portion having a pair of long intermediate rods extending between arcuate end rods, the pair of long intermediate rods having cross bars extending therebetween inwardly of end portions thereof, the rack system having a plurality of racks, each of the racks having end portions and an intermediate portion therebetween, the end portions secured to the cross bars in a spaced and angular relationship whereby the intermediate portion being disposed over a central open portion of the base portion;

a sauce pan having an open top, a closed bottom, and upwardly extending peripheral edge, the upwardly extending peripheral edge having a rim extending outwardly from an upper portion thereof, the upwardly extending peripheral edge having a plurality of apertures therethrough, the plurality of apertures having a mesh screen disposed therein;

a support rack dimensioned for receipt of the sauce pan therein, the support rack having hooked end portions for coupling to a grill.

2. A rib rack with sauce pan comprising:

a rack system comprised of elongated rods, a sauce pan having an open top, a closed bottom, and upwardly extending peripheral edge, the upwardly extending peripheral edge having a rim extending outwardly from an upper portion thereof, the upwardly extending peripheral edge having a plurality of apertures therethrough, the plurality of apertures having a mesh screen disposed therein.

3. The rib rack as set forth in claim 2 wherein the rack system having an elongated circular base portion, the base portion having a pair of long intermediate rods extending between arcuate end rods, the pair of long intermediate rods having cross bars extending therebetween inwardly of end portions thereof, the rack system having a plurality of racks, each of the racks having end portions and an intermediate portion therebetween, the end portions secured to the cross bars in a spaced and angular relationship whereby the intermediate portion being disposed over a central open portion of the base portion.

4. The rib rack as set forth in claim 2 and further including a support rack dimensioned for receipt of the sauce pan therein, the support rack having hooked end portions for coupling to a grill.

5. The rib rack as set forth in claim 1 and further including a grill portion having an open top dimensioned for coupling with the hooked end portions of the support rack.

* * * * *